United States Patent Office 2,702,812
Patented Feb. 22, 1955

2,702,812

11β,14α,17α-TRIHYDROXYPROGESTERONE

Gilbert M. Shull, Huntington Station, Donald A. Kita, Jackson Heights, and Jacob W. Davisson, Levittown, N. Y., assignors to Chas. Pfizer & Co., Inc., New York, N. Y., a corporation of Delaware No Drawing. Application February 10, 1954, Serial No. 409,534

1 Claim. (Cl. 260—397.45)

This invention is concerned with a new compound, 11β,14α,17α-trihydroxyprogesterone, which is formed when the steroid compound, 17α-hydroxyprogesterone, is subjected to the oxygenating activity of a fungus from the genus Curvularia.

The present application is a continuation-in-part of the earlier filed application Serial No. 322,578, filed on November 25, 1952, by Gilbert M. Shull et al. Another continuation-in-part of that parent application has issued as U. S. Patent 2,658,023.

As was disclosed in these previous applications, steroid compounds may be oxygenated by subjecting them to the oxygenating activity of a fungus from the genus Curvularia. This present invention is concerned with a product formed when a particular steroid compound, 17α-hydroxyprogesterone, is so treated. This product has been isolated in pure crystalline form; its physical constants have been determined, and its structure has been shown to be 11β,14α,17α-trihydroxyprogesterone. Most significantly, it has been discovered that the compound possesses biological activity to a marked degree, as shown by a positive thymus involution test and a positive liver glycogen test. As the compound is a highly oxygenated steroid with many centers of potential chemical reactivity, it is also useful as an intermediate in synthesis. The compound also lends itself to the introduction of a hydroxyl group at the 21 position. This may be accomplished, for example, by bromination, replacement of the bromine by iodine and treatment with potassium acetate. Hydrolysis of the acetate group gives a hydroxyl group. Dehydration results in the loss of the tertiary 14 hydroxyl group and the introduction of a double bond, hydrogenation of which yields Compound F.

Example

A culture of *Curvularia lunata*, NRRL-2380, was propagated on an agar nutrient medium. The organism was rinsed from the agar slants under sterile conditions into a sterile medium having the following composition:

| | Percent |
|---|---|
| Malt extract | 5.0 |
| Sucrose | 1.0 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 with potassium hydroxide.

On this medium the organism was cultured under aerobic conditions. The mycelium from two liters of such a mixture obtained after 22 hours of growth was filtered, washed with a small volume of distilled water and then suspended in two liters of distilled water. One-half gram of 17α-hydroxyprogesterone was added to the mixture. This preparation was stirred and aerated at the rate of one-half volume of air per volume of mixture per minute for 16 hours. The mixture was then extracted with one-half volume of chloroform three times. The combined chloroform extracts were concentrated to a small volume and the mixture of steroids was purified by chromatography on a silica gel column. A mixture of 97 volumes of methylene chloride and 3 volumes of 95% ethanol was used as the developer.

Three products have been isolated. The first of these was eluted from the column in small amounts and has not yet been identified with certainty. Then 11β,14α,17α-trihydroxyprogesterone was eluted, in about a 20% yield. Following these, another compound was obtained in small amounts, in the form of a white crystalline substance which has a melting point of 261–262° C.

The compound 11β,14α,17α-trihydroxyprogesterone has a melting point of 247–250° C., after it has been recrystallized from ethyl acetate. Its optical rotation is $[\alpha]_D^{EtOH} + 181.2°$ and its ultraviolet absorption maximum is 242 mμ. Treatment with concentrated sulfuric acid yields a chromogen with ultraviolet absorption maxima at 286 mμ, 385 mμ, and 442 mμ.

The biological activity of 11β,14α,17α-trihydroxyprogesterone was shown by the fact that it gave a positive thymus involution test, and a positive liver glycogen test. These are standard methods used to test for the presence of cortisone like activity. Very few compounds give positive tests, and those which do are known to be therapeutically useful. This new compound was shown to be about 40% as active as dihydrocortisone (Compound F).

The above example is given merely by way of illustration, and the scope of this invention is to be limited by the appended claim only.

What is claimed is:

A new steroid compound, 11β,14α,17α-trihydroxyprogesterone.

References Cited in the file of this patent

UNITED STATES PATENTS

| | | |
|---|---|---|
| 2,602,769 | Murray et al. | July 8, 1952 |
| 2,656,349 | Ruzicka et al. | Oct. 20, 1953 |
| 2,658,023 | Shull et al. | Nov. 3, 1953 |
| 2,662,089 | Murray et al. | Dec. 8, 1953 |
| 2,666,069 | Bernstein et al. | Jan. 12, 1954 |
| 2,670,358 | Murray et al. | Feb. 23, 1954 |
| 2,671,093 | Lincoln et al. | Mar. 2, 1954 |
| 2,673,866 | Murray et al. | Mar. 30, 1954 |

FOREIGN PATENTS

| | | |
|---|---|---|
| 653,480 | Great Britain | May 16, 1951 |